United States Patent
Sienel

(10) Patent No.: US 7,458,418 B2
(45) Date of Patent: *Dec. 2, 2008

(54) STORAGE TANK FOR HOT WATER SYSTEMS

(75) Inventor: Tobias H. Sienel, Manchester, CT (US)

(73) Assignee: Carrier Corporation, Syracuse, NY (US)

( * ) Notice: Subject to any disclaimer, the term of this patent is extended or adjusted under 35 U.S.C. 154(b) by 422 days.

This patent is subject to a terminal disclaimer.

(21) Appl. No.: 11/129,806

(22) Filed: May 16, 2005

(65) Prior Publication Data

US 2005/0218240 A1    Oct. 6, 2005

Related U.S. Application Data

(62) Division of application No. 10/341,008, filed on Jan. 13, 2003, now Pat. No. 6,907,923.

(51) Int. Cl.
*F24H 1/18* (2006.01)
(52) U.S. Cl. .................. 165/236; 165/50; 165/104.19; 165/104.31; 165/301; 62/434; 62/435; 62/238.6; 60/652; 60/659; 126/437
(58) Field of Classification Search .............. 165/236, 165/50, 104.19, 104.31, 301; 62/434, 435, 62/238.6; 60/652, 659; 126/437
See application file for complete search history.

(56) References Cited

U.S. PATENT DOCUMENTS

| 2,486,833 | A | 11/1949 | Freund |
| 4,135,571 | A | 1/1979 | Tamblyn et al. |
| 4,174,009 | A | 11/1979 | Laing et al. |

(Continued)

FOREIGN PATENT DOCUMENTS

CN    1337556 A    2/2002

(Continued)

OTHER PUBLICATIONS

Saikawa et al., Development of Prototype of CO2 Heat Pump Water Heater for Residential Use, Jul. 23, 2000, pp. 97-102.

(Continued)

*Primary Examiner*—John K Ford
(74) *Attorney, Agent, or Firm*—Carlson, Gaskey & Olds

(57) ABSTRACT

A heat pump system includes a compressor, a heat rejecting heat exchanger, an expansion device, and a heat accepting heat exchanger. A storage tank stores the water that cools the refrigerant in the heat rejecting heat exchanger. A mechanical interface plate positioned between a hot water reservoir and a cold water reservoir in the storage tank reduces heat transfer between the hot water and the cold water. During a water heating mode, cold water from the cold reservoir flows into the heat sink to cool the refrigerant in the heat rejecting heat exchanger. As the water exchanges heat with the refrigerant, the water is heated in the heat sink, exits the heat sink, and flows into the hot reservoir of the storage tank. During a water discharge mode, the hot water in the hot reservoir is removed from the storage tank and flows into a hot water discharge. Cold water from a water source flows into the cold reservoir of the storage tank to refill the storage tank.

12 Claims, 2 Drawing Sheets

U.S. PATENT DOCUMENTS

| | | | |
|---|---|---|---|
| 4,182,489 | A | 1/1980 | Lessieur |
| 4,390,008 | A | 6/1983 | Andrews |
| 4,479,352 | A | 10/1984 | Yamaoka et al. |
| 4,523,629 | A * | 6/1985 | Copeland ............... 165/104.19 |
| 4,590,992 | A | 5/1986 | Tamblyn |
| 5,898,818 | A | 4/1999 | Chen |
| 5,984,198 | A | 11/1999 | Bennett et al. |
| 6,370,896 | B1 | 4/2002 | Sakakibara et al. |
| 6,907,923 | B2 * | 6/2005 | Sienel ........................ 165/236 |

FOREIGN PATENT DOCUMENTS

| | | |
|---|---|---|
| DE | 2912785 | 10/1980 |
| DE | 3046601 | 7/1982 |
| DE | 3115988 | 1/1983 |
| DE | 3305041 | 2/1983 |
| DE | 64-88058 | 4/1989 |
| EP | 0190728 | 8/1986 |
| EP | 190728 A2 * | 8/1986 |
| EP | 2758614 | 1/1997 |
| EP | 1 235 040 | 8/2002 |
| FR | 2 758 614 | 7/1998 |
| FR | 2758614 | 7/1998 |
| FR | 2758614 | 3/2008 |
| JP | 58123047 | 7/1983 |
| JP | 58179764 | 10/1983 |
| JP | 1123948 | 5/1989 |
| JP | 1167552 | 7/1989 |
| JP | 2-64344 | 3/1990 |
| JP | 3-87562 | 4/1991 |
| JP | 5-99505 | 4/1993 |
| JP | 6-305031 | 11/1994 |
| JP | 6305031 | 11/1994 |
| JP | 8-261674 | 10/1996 |
| JP | 11-148728 | 6/1999 |
| JP | 2000346448 | 12/2000 |
| JP | 2001-9443 | 1/2001 |
| JP | 2001082803 | 3/2001 |
| JP | 2001221501 | 8/2001 |
| JP | 2001241762 | 9/2001 |
| JP | 2001241763 | 9/2001 |
| JP | 2002048420 | 2/2002 |
| JP | 2002081768 | 3/2002 |
| JP | 2002147846 | 5/2002 |
| JP | 2002188860 | 7/2002 |
| JP | 2002250560 | 9/2002 |
| JP | 2002-286290 | 10/2002 |
| JP | 2002286288 | 10/2002 |
| JP | 2002295901 | 10/2002 |
| JP | 2002340400 | 11/2002 |
| JP | 2002340401 | 11/2002 |
| JP | 2002340440 | 11/2002 |
| JP | 2003014294 | 1/2003 |
| JP | 2003050051 | 2/2003 |
| JP | 2003056907 | 2/2003 |
| JP | 2003106652 | 4/2003 |
| JP | 2003130452 | 5/2003 |
| JP | 2003130459 | 5/2003 |
| JP | 2003139392 | 5/2003 |
| JP | 2003148809 | 5/2003 |
| WO | WO 03/042606 | 5/2003 |
| WO | WO 03/064935 | 8/2003 |

OTHER PUBLICATIONS

Neksa et al., CO2—Heat Pump Water Heater; Characteristics, system Design and Experimental Results, May 1998, pp. 172-179, Elsevier Science ltd., Great Britain.

Abdoly et al., Theoretical and Experimental Studies of Stratified Thermocline Storage of Hot Water, Energy Convers. Mgmt., 1982, pp. 275-285, vol. 22, Great Britain.

International Search Report dated Jun. 1, 2004 for International application No. PCT/2004/000666.

Jorn Stene, "A Method for Increasing the Energy Efficiency of Residential CO2 Heat Pump Water Heater Systems" 5th IIR-Gustav Lorentzen Conference on Natural Working Fluids, Sep. 17, 2002, pp. 276-283, Guangzhov, P.R. China.

Jeffrey J. Nieter & Yu Chen, "Modeling and Experimental Study of a Carbon Dioxide Reciprocating Piston Compressor" 5th IIR-Gustav Lorentzen Conference on Natural Working Fluids, Sep. 17, 2002, pp. 284-291, Guangzhov, P.R. China.

Jorn Stene, "A Method for Increasing the Energy Efficiency of Residential CO2 Heat Pump Water Heater Systems" 5th IIR-Gustav Lorentzen Conference on Natural Working Fluids, Sep. 17, 2002, pp. 276-283, Guangzhov, P.R. China.

Jeffery J. Nieter & Yu Chen, "Modeling and Experimental Study of a Carbon Dioxide Reciprocating Piston Compressor" 5th IIR-Gustav Lorentzen Conference on Natural Working Fluids, Sep. 17, 2002, pp. 284-291, Guangzhov, P.R. China.

Saikawa et al., Development of Prototype of CO2 Heat Pump Water Heater For Residential Use, Jul. 23, 2000, pp. 97-102.

Neksa et al., CO2-Heat Pump Water Heater: Characteristics, System Design and Experimental Results, May 1998, pp. 172-179, Elsevier Science Ltd., Great Britain.

Abdoly et al., Theoretial and Experimental Studies Of Stratified Thermocline Storage Of Hot Water, Energy Convers. Mgmt., 1982, pp. 275-285, vol. 22, Great Britain.

International Search Report dated Jun. 1, 2004.

* cited by examiner

STORAGE TANK FOR HOT WATER SYSTEMS

This application is a Divisional patent application of U.S. patent application Ser. No. 10/341,008 filed Jan. 13, 2003 now U.S. Pat. No. 6,907,923.

BACKGROUND OF THE INVENTION

The present invention relates generally to a storage tank for a hot water system that includes a mechanical insulator for the separation of the hot layer and the cold layer.

Hot water systems commonly include a storage tank that stores the fluid, such as water, that cools the refrigerant in the heat rejecting heat exchanger. By employing a storage tank, the size, cost, and cycling of the hot water generation component can be reduced. In a heat pump system, hot water is generated outside of the storage tank. Heat pump system efficiency is directly related to the inlet temperature of the water in the heat sink which exchanges heat with the refrigerant. As the inlet temperature of the fluid into the heat sink decreases, system efficiency increases.

By flowing water into the storage tank slowly, a hot layer and cold layer can be formed in the storage tank which is separated by a thermal interface layer. The amount of hot water in the storage tank varies at any given time as the hot water generation capacity typically does not match the load demands of the system. Therefore, the thermal interface layer moves up and down in the storage tank as loads are placed on the system, and includes a range of temperatures between the hot layer and the cold layer.

There is also a concern about the formation of legionella in hot water storage tanks which occur between 25 to 42° C. and because of sediment and scaling.

SUMMARY OF THE INVENTION

A heat pump water heat system includes a compressor, a heat rejecting heat exchanger, an expansion device, and a heat accepting heat exchanger. Refrigerant circulates though the closed circuit system.

A storage tank stores the water that exchanges heat with the refrigerant in the heat rejecting heat exchanger. A mechanical interface plate positioned between a hot reservoir and a cold reservoir in the storage tank reduces heat transfer between the water in the hot reservoir and the cold reservoir. As the cold water in the cold reservoir is more dense than the hot water in the hot reservoir, it is below the hot reservoir. The mechanical interface plate is designed to have an effective density between the hot and cold water densities, enabling the mechanical interface plate to float between the two reservoirs.

The coefficient of performance for the system is determined by the water temperature at the inlet of the heat rejecting heat exchanger. As the inlet temperature of the water increases, the coefficient of performance of the heat pump system decreases.

During a water heating mode, cold water in the cold reservoir flows into the heat rejecting heat exchanger to cool the refrigerant. As the water exchanges heat with the refrigerant, the water is heated and exits the heat rejecting heat exchanger. The heated water flows into the hot reservoir of the storage tank. During a water discharge mode, the hot water in the hot reservoir is removed from the storage tank and flows into a hot water discharge. Cold water from a water source flows into the cold reservoir of the storage tank to refill the storage tank.

Alternately, the hot water and/or the cold water are placed in expandable elements, such as a bladder or bellows, in the hot reservoir and the cold reservoir, respectively. The interface plate is located between the hot layer and the cold layer.

When both the hot water and the cold water are placed in the expandable elements the heat transfer potential between the two layers is minimized. In this example, the interface plate does not need to be designed with an effective density as the interface plate is supported by either one or both of the expandable elements. Additionally, in this example, the hot reservoir can be located above, below or to the side of the cold reservoir.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
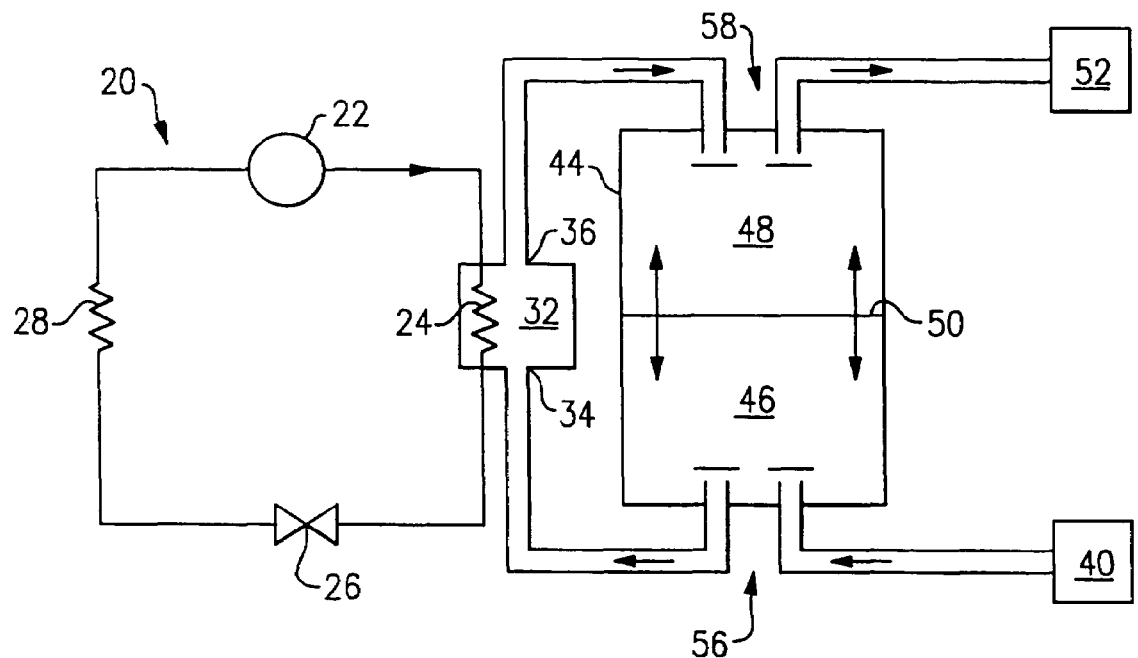
FIG. 1 illustrates a schematic diagram of a prior art heat pump system.

FIG. 1 illustrates a prior art heat pump water system 20 including a compressor 22, a heat rejecting heat exchanger 24, an expansion device 26, and a heat accepting heat exchanger 28. Refrigerant circulates though the closed circuit system 20.

The refrigerant exits the compressor 22 at high pressure and enthalpy and flows through the heat rejecting heat exchanger 24. In the heat rejecting heat exchanger 24, the refrigerant loses heat, exiting the heat rejecting heat exchanger 24 at low enthalpy and high pressure. A fluid medium, such as water, flows through a heat sink 32 and exchanges heat with the refrigerant passing through the heat rejecting heat exchanger 24. After exchanging heat with the refrigerant, the heated water exits through the heat sink outlet 36. The refrigerant then passes through the expansion device 26, and the pressure drops. After expansion, the refrigerant flows through the heat accepting heat exchanger 28 and exits at a high enthalpy and low pressure. The refrigerant then re-enters the compressor 22, completing the system 20.

The system 20 further includes a storage tank 44 that stores the water that exchanges heat with the refrigerant in the heat rejecting heat exchanger 24. During a water heating mode, when cooling of the refrigerant in the heat rejecting heat exchanger 24 is necessary, cold water from a cold layer 46 of the storage tank 44 flows through the opening 56 in the storage tank 44 and into the heat sink 32 through an inlet 34, cooling the refrigerant in the heat rejecting heat exchanger 24. As the water exchanges heat with the refrigerant, the water is heated in the heat sink 32 and exits the heat sink 32 through the heat sink outlet 36. The heated water flows into the hot layer 48 of the storage tank 44 through an opening 58.

During a water discharge mode, the hot water from the hot layer 48 is removed from the storage tank 44 through the opening 58 and flows into a hot water discharge 52. Cold water from a water source 40 flows into the system 20 and enters the cold layer 46 of the storage tank 44 through an opening 56, refilling the storage tank 44.

By allowing water to enter the storage tank 44 slowly, the hot layer 48 and the cold layer 46 can be formed in the storage tank 44. A thermal interface layer 50 is formed between the hot layer 48 and the cold layer 46 and moves up and down in the storage tank 44 as the system 20 operates and the volumes in the hot layer 48 and the cold layer 46 change. The thermal interface layer 50 includes a range of temperatures between the hot layer 48 and the cold layer 46.

The coefficient of performance for the system 20 is determined by the water temperature at the inlet 34 of the heat sink 32 of the heat rejecting heat exchanger 24. The coefficient of performance decreases as the inlet water temperature increases.

Figure 2:
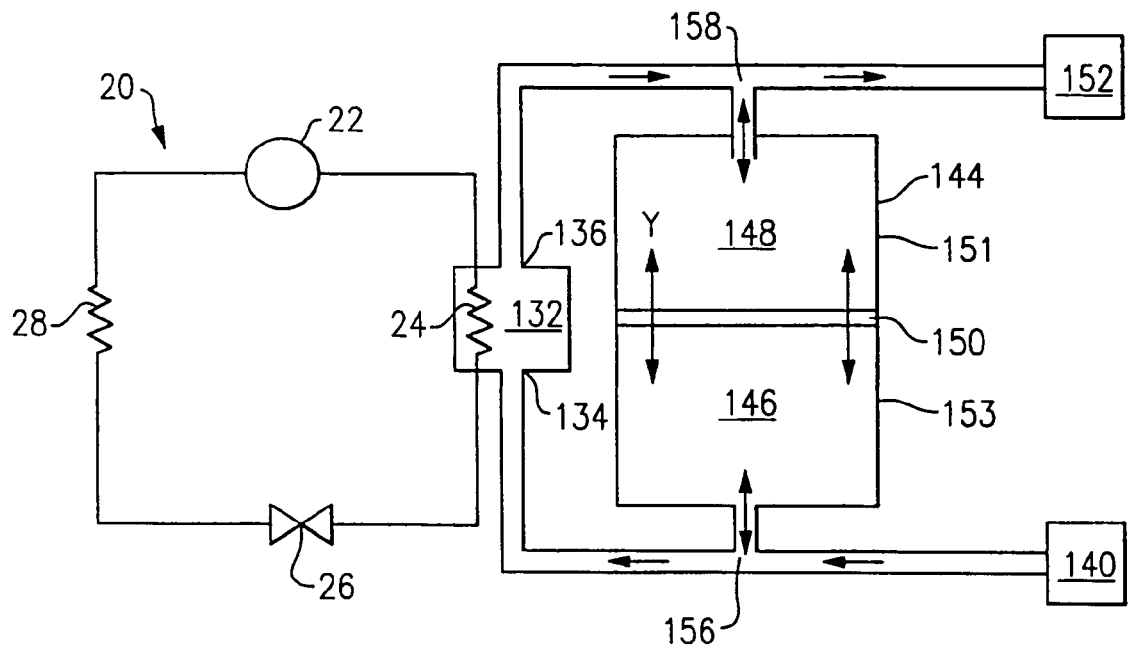
FIG. 2 illustrates the heat pump system of the present invention.

FIG. 2 illustrates the storage tank 144 of the present invention. A mechanical interface plate 150 moveable in the Y direction is positioned in the storage tank 144 between the hot reservoir 148 and the cold reservoir 146 to reduce heat transfer between the reservoirs 146 and 148. As the cold water in the cold reservoir 146 is more dense than the hot water in the hot reservoir 148, the cold reservoir 146 is located below the hot reservoir 148. In one example, the mechanical interface plate 150 has a density greater than the hot water in the hot reservoir 148, but a density less than the cold water in the cold reservoir 146 so that the mechanical interface plate 150 floats between the hot reservoir 148 and the cold reservoir 146. By employing the moveable mechanical interface plate 150 to separate the hot water and the cold water in the storage tank 144, the internal heat transfer and mixing losses in the storage tank 144 are reduced, and the effective efficiency of the system 20 is increased.

Figure 3:
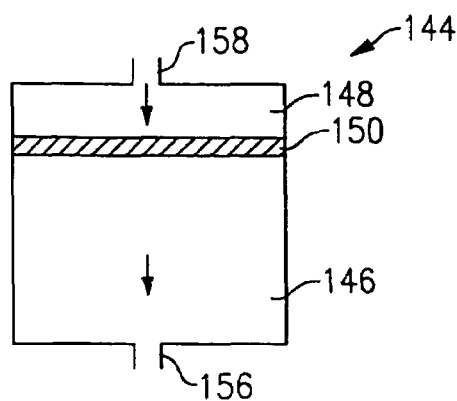
FIG. 3 illustrates the storage tank of the present invention in the water heating mode.
Figure 4:
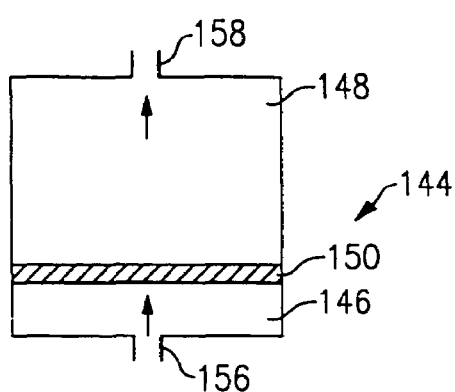
FIG. 4 illustrates the storage tank of the present invention in the water discharge mode.
Figure 5:
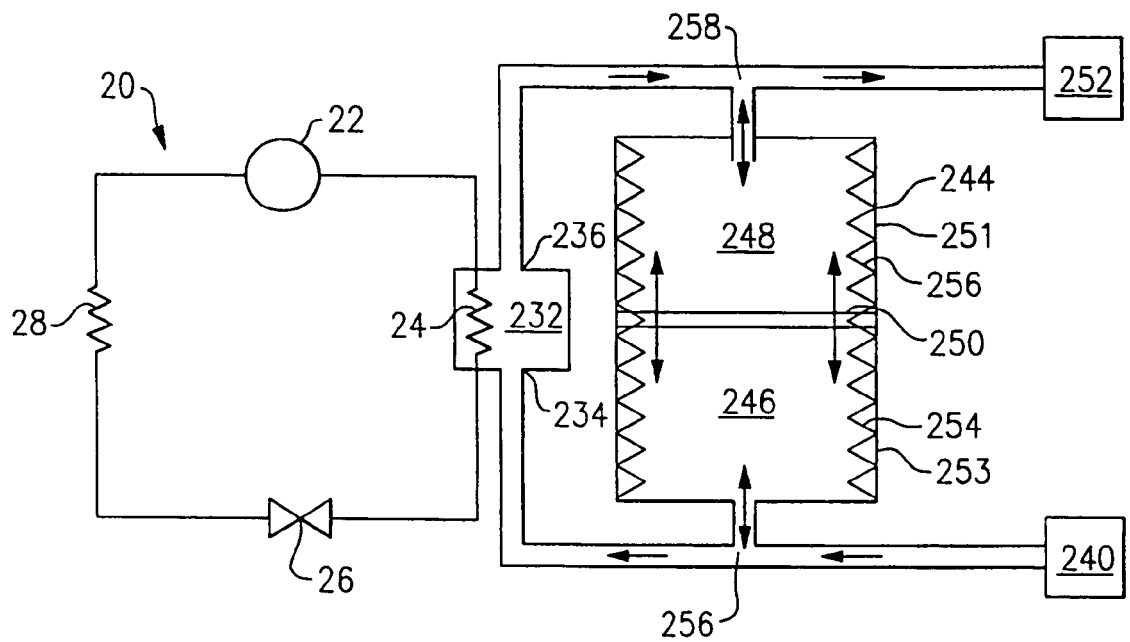
FIG. 5 illustrates an alternate example of the present invention.

FIGS. 3 and 4 illustrate the storage tank 144 in the water heating mode and the water discharge mode, respectively. As shown in FIGS. 4 and 5, during the water discharge mode, hot water in the hot reservoir 148 exits the storage tank 144 through an opening 158 and flows to the hot water discharge 152. As the hot water exits the storage tank 144, water from a water source 140 flows through the opening 156 of the storage tank 144 to fill the cold reservoir 146. As the hot water in the hot reservoir 148 exits the storage tank 144, the water from the water source 140 is supplied at the same flow rate through the opening 156 to flow into the cold reservoir 146 of the storage tank 144. The mechanical interface plate 150 moves towards the hot reservoir 148 during the water discharge mode, increasing the volume of the cold reservoir 146 and decreasing the volume of the hot reservoir 148.

As shown in FIGS. 3 and 5, during the water heating mode, cold water from the cold reservoir 146 flows through the opening 156 and through the heat sink 132 of the heat rejecting heat exchanger 24. In the heat rejecting heat exchanger 24, the water exchanges heat with the refrigerant, cooling the refrigerant and heating the water. The heated water is then delivered to the hot reservoir 148 of the storage tank 144 through the opening 158. The mechanical interface plate 150 moves towards the cold reservoir 146 during the water heating mode, increasing the volume of the hot reservoir 148 and decreasing the volume of the cold reservoir 146.

The actuation of the water heating mode can be controlled by the position of the mechanical interface plate 150 through a level switch 151 or other sensor. When the level switch 151 detects that the mechanical interface plate 150 has moved above the level switch 151, the water heating mode is actuated and hot water begins to fill the hot reservoir 148 of the storage tank 144, lowering the mechanical interface plate 150 to expand the volume of the hot reservoir 148 Similarly, when the mechanical interface plate 150 drops below a second level switch 153, the water heating mode is terminated. The location of the switches 151 and 153 can be determined to minimize the overall energy consumption of the system 20, including standby losses. One skilled in the art would know where to locate the switches 151 and 153.

The water heating mode and the water discharge mode can also occur simultaneously during operation.

FIG. 5 illustrates an alternate storage tank 244. The storage tank 244 operates in the same manner as the storage tank 144. The hot water in the hot reservoir 248 and the cold water in the cold reservoir 246 are placed in an expandable elements 254 and 256, respectively. The expandable elements 254 and 256 can be a bladder or bellows. The interface plate 250 is located between the hot reservoir 248 and the cold reservoir 246. When both the hot water and the cold water are placed in the expandable elements 256 and 254, respectively, the heat transfer potential between the two reservoirs 246 and 248 is minimized. Although it has been illustrated and described that both the water in the cold reservoir 246 and the hot reservoir 248 are in expandable elements 254 and 256, it is to be understood that only the water in the hot reservoir 248 or the water in the cold reservoir 246 are in an expandable element. Additionally, in this example, the interface plate 250 does not need to be designed with an effective density, as the interface plate 250 is supported by either one or both of the expandable elements 254 and 256. Although not illustrated, it is to be understood that the hot reservoir 248 can be located above, below, or to the side of the cold reservoir 246.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A heat pump system comprising:
   a compression device to compress a refrigerant to a high pressure;
   a heat rejecting heat exchanger for cooling said refrigerant;
   a tank that stores a cold fluid medium in a cold reservoir that cools said refrigerant in said heat rejecting heat exchanger and stores a hot fluid medium that is heated by said refrigerant in a hot reservoir, said tank including a moveable interface plate that separates said cold fluid medium from said hot fluid medium in said tank, wherein said cold fluid medium flows from said cold reservoir of said tank to said heat rejecting heat exchanger, exchanges heat with said refrigerant in said heat rejecting heat exchanger to form said hot fluid medium, and said hot fluid medium flows from said heat rejecting heat exchanger to said hot reservoir of said tank during a water heating mode;
   an expansion device for reducing said refrigerant to a low pressure;
   a heat accepting heat exchanger for heating said refrigerant; and a first sensor and a second sensor that detect a position of said moveable interface plate, and said water heating mode begins when said first sensor detects that said moveable interface plate moves above said first sensor and said water heating mode ends when said second sensor detects that said moveable interface plate moves below said second sensor.

2. The system as recited in claim 1 wherein said cold fluid medium and said hot fluid medium are water.

3. The system as recited in claim 1 wherein said interface plate moves towards said cold reservoir during said water heating mode, decreasing a cold volume of said cold reservoir and increasing a hot volume of said hot reservoir.

4. The system as recited in claim 1 wherein said cold fluid medium flows into said cold reservoir of said tank from a water source and said hot fluid medium flows out of said hot reservoir to a hot water discharge during a water discharge mode.

5. The system as recited in claim 4 wherein said interface plate moves towards said hot reservoir during said water discharge mode, decreasing a hot volume of said hot reservoir and increasing a cold volume of said cold reservoir.

6. The system as recited in claim 1 wherein said cold fluid medium has a first density, said hot fluid medium has a second density, and said interface plate has a third density greater than said second density and less than said first density.

7. The system as recited in claim 6 wherein said interface plate floats between said hot reservoir and said cold reservoir.

8. The system as recited in claim 1 wherein said tank further includes a hot opening and a cold opening, and said hot fluid medium flows into and out of said hot reservoir though said hot opening and said cold fluid medium flows into and out of said cold reservoir through said cold opening.

9. The system as recited in claim 1 wherein termination of said water heating mode is controlled by a position of said moveable interface plate.

10. The system as recited in claim 1 wherein said hot reservoir is located above said cold reservoir.

11. The system as recited in claim 1 wherein said interface plate moves in a vertical direction.

12. A method of heating a fluid comprising the steps of:
compressing a refrigerant to a high pressure;
flowing a cold fluid medium from a cold reservoir of a tank;
cooling said refrigerant by exchanging heat with said cold fluid medium;
heating said cold fluid medium with said refrigerant to form a hot fluid medium;
flowing said hot fluid medium to a hot reservoir of said tank;
moving an interface plate that separates said cold reservoir and said hot reservoir in said tank;
providing a first sensor and a second sensor for sensing the position of the moveable interface plate;
sensing a position of the interface plate with each of the first sensor and the second sensor;
beginning a water heating mode in response to detecting movement of the interface plate above the first sensor;
ending the water heating mode in response to detecting movement of the interface plate below the second sensor;
expanding said refrigerant to a low pressure; and
heating said refrigerant.

\* \* \* \* \*